United States Patent [19]

Vacquer

[11] Patent Number: 5,063,771

[45] Date of Patent: Nov. 12, 1991

[54] METHOD OF FUMIGATING BULK CEREAL GRAINS

[75] Inventor: Michel Vacquer, Rouen, France

[73] Assignee: Desinsectisation Moderne, Rouen, France

[21] Appl. No.: 479,853

[22] Filed: Feb. 14, 1990

[30] Foreign Application Priority Data

Feb. 17, 1989 [FR] France ................ 89 02113

[51] Int. Cl.$^5$ ............................................. G01M 3/04
[52] U.S. Cl. ...................................... 73/40.7; 426/320; 426/419
[58] Field of Search .................... 73/40.7; 48/195; 426/320, 419

[56] References Cited

U.S. PATENT DOCUMENTS

| | | | |
|---|---|---|---|
| 3,112,189 | 11/1963 | Elliot | 48/195 |
| 3,483,735 | 12/1969 | Packo | 73/40.7 |
| 3,523,771 | 8/1970 | Anderson | 48/193 |
| 4,612,798 | 9/1986 | Roberts | 73/40.7 |
| 4,894,539 | 1/1990 | Hurst | 73/40.5 R |

FOREIGN PATENT DOCUMENTS

| | | |
|---|---|---|
| 1577354 | 6/1969 | France . |
| 379443 | 8/1964 | Switzerland . |
| 789089 | 4/1955 | United Kingdom . |

OTHER PUBLICATIONS

Le Vide, vol. 16, No. 93, May/Jun. 1961, pp. 141–142, Paris, France.
Patent Abstracts of Japan, vol. 6, No. 108.

*Primary Examiner*—Hezron E. Williams
*Assistant Examiner*—William Francos
*Attorney, Agent, or Firm*—Schweitzer Cornman & Gross

[57] ABSTRACT

Method of fumigating bulk cereal grains while in storage, comprising the steps of providing a closed empty compartment having internal and external walls in which compartment said cereal grain is to be stored; initially exposing the internal walls of said empty compartment and the space within said compartment to a first fumigant to disinfect the compartment; said first fumigant being providing in sufficient volume to leave a residue film deposit of fumigant on said internal walls; inspecting the external walls of said compartment to ascertain the degree of air-tightness of said empty compartment during said initial fumigation by seeking to detect leaks; repairing any leaks detected during said initial fumigation and inspection; thereafter loading said compartment with bulk cereal grain; and closing said compartment and exposing said grain to a second fumigant to disinfect said bulk cereal grain with said second fumigant as well as with said residue of said first fumigant.

3 Claims, No Drawings

METHOD OF FUMIGATING BULK CEREAL GRAINS

BACKGROUND OF THE INVENTION

The present invention relates to a method for testing for leaks in compartments intended to contain goods, especially cereals, in bulk, in which disinfection or an insecticidal action by fumigation is to be performed at a later time.

In order to destroy pests which might damage goods, particularly cereals stored in bulk in compartments such as grain elevators or the holds of ships, the operation of disinfection by fumigation are currently performed by introducing into the compartment containing the cereals a fumigant which releases a toxic gas in a concentration that is lethal to the pests.

For this purpose, fumigants are used, which are introduced in the solid state, for example a metal phosphide such as aluminum phosphide which decomposes in the presence of water to form hydrogen phosphide or phosphine, which is a poison for insects and rodents, but also to human beings.

It is important, therefore, that the compartments in which the fumigation is performed be perfectly air-tight to prevent the toxic gases from escaping from the compartment and poisoning employees in the vicinity. Furthermore, air-tightness is essential to maintaining the necessary gas concentration in the compartment throughout the period of treatment.

SUMMARY OF THE PRESENT INVENTION

It is the purpose of the present invention to propose a particularly simple and economical method of testing the air-tightness of compartments in which disinfection is to be performed later on by fumigation, and identifying in a precise manner the location of any leaks.

The method of the present invention is characterized essentially by the fact that a fumigant gas or solid or liquid product capable of creating a fumigant gas is introduced into the compartment empty of the goods, and inspecting the outside of the periphery of the closed compartment in order to detect any sign of a leakage of the said gas.

The term, "fumigant gas, " as used in accordance with the invention, is to be understood to be a gas suitable for performing a disinfestation of insects and the destruction of animal pests in the compartment.

Preferably, a gas having a density lower than that of the air, which therefore will tend to escape more easily through any openings or cracks in the wall of the compartment, and which can be detected quickly. The gas can be injected lone or in mixture with a propellant gas under pressure into the compartment if necessary through an existing closable conduit or one provided for this purpose and leading into the interior of the compartment.

As a variant, the gas can be formed by thermal fogging or produced by release from a solid or liquid product introduced into the compartment, if necessary by chemical reaction with a reaction produce simultaneously introduced prior to the complete closure of the compartment, or thereafter, through a closable conduit or opening already existing or provided for this purpose.

It will be remembered that thermal fogging consists in injecting a liquid product by means of a hot gun to constitute a fog projected under pressure.

According to the present invention, a gas visible to the naked eye, in the form of smoke, colored if necessary, in which case the detection of leakage from the compartment can be made by simple visual inspection of its periphery.

It is also possible in the scope of the invention to use such gases which are not visible to the naked eye.

In particular, gases having an odor but nontoxic to mn can be used, in which case the detection can be made by smelling by a person moving about the exterior periphery of the compartment.

In one particular embodiment of the invention, the fumigant gas used can be the same gas as that which later on will be used for the disinfection by fumigation of the compartment once the latter has been filled.

According to the invention, the destruction of animal pests which might be in the compartment before filling is performed at the same time as the detection of any leaks in the compartment.

If the fumigant gas is toxic to man, it is necessary to equip the personnel who are to proceed to the visual inspection of the external periphery of the compartment with protective equipment, particularly gas masks.

If necessary, the detection can be performed by means of portable detection devices using particularly chemical reagents sensitive to the gas used.

Once the detection in accordance with the invention has been carried out, the operations of plugging leaks and making repairs can proceed, so that the later fumigating operations, after the introduction of the goods, particularly cereals in bulk, can be performed in a perfectly air-tight compartment without any danger to the personnel called upon to be in the vicinity.

The employment of the invention permits the deposition on the walls of the compartment of a film of insecticide product whose effect will continue after the compartment is filled.

The present invention can be employed in bulk grain elevators in land installations such as flour mills or harbor equipment.

It can also be used in the holds of ships, when the latter are docked or at sea, the process being able then to be performed successively on each of the holds.

The employment of the process of the invention increases the efficacy of the fumigation, which must be performed again after the compartment is filled.

Indeed, particularly in the holds of ships, the wall temperature is lower than that of the products, particularly cereals, which are to be treated. The fumigant gases generally used lose their efficacy at low temperatures (below 8° C.), and furthermore the temperature difference between the product to be treated and the wall causes currents of air carrying the gas and preventing it from coming in contact with the wall, so that the wall and the product in its vicinity are rarely effectively treated. The film deposited when the invention is utilized remedies this shortcoming.

Although the invention has been described in connection with particular embodiments, it is quite evident that it is by no means limited, and that many variants and modifications can be made in it without thereby departing from its scope and its spirit.

I claim:

1. Method of fumigating bulk cereal grains while in storage, comprising the steps of:

(a) providing a closed empty compartment having internal and external walls in which compartment said cereal grain is to be stored;

(b) initially exposing the internal walls of said empty compartment and the space within said compartment to a first fumigant to disinfect the compartment;

(c) said first fumigant being providing in sufficient volume to leave a residue film deposit of fumigant on said internal walls;

(d) inspecting the external walls of said compartment to ascertain the degree of air-tightness of said empty compartment during said initial fumigation by seeking to detect leaks;

(e) repairing any leaks detected during said initial fumigation and inspection;

(f) thereafter loading said compartment with bulk cereal grain; and (g) closing said compartment and exposing said grain to a second fumigant to disinfect said bulk cereal grain with said second fumigant as well as with said residue of said first fumigant.

2. The method of claim 1 in which:

(a) said first and second fumigants are a gas of the same composition.

3. The method of claim 1 in which:

(a) said first fumigant is generated from a solid or liquid placed in said empty compartment.

* * * * *